A. L. PUTNAM.
VEHICLE WHEEL.
APPLICATION FILED MAY 3, 1917.
1,388,665.
Patented Aug. 23, 1921.
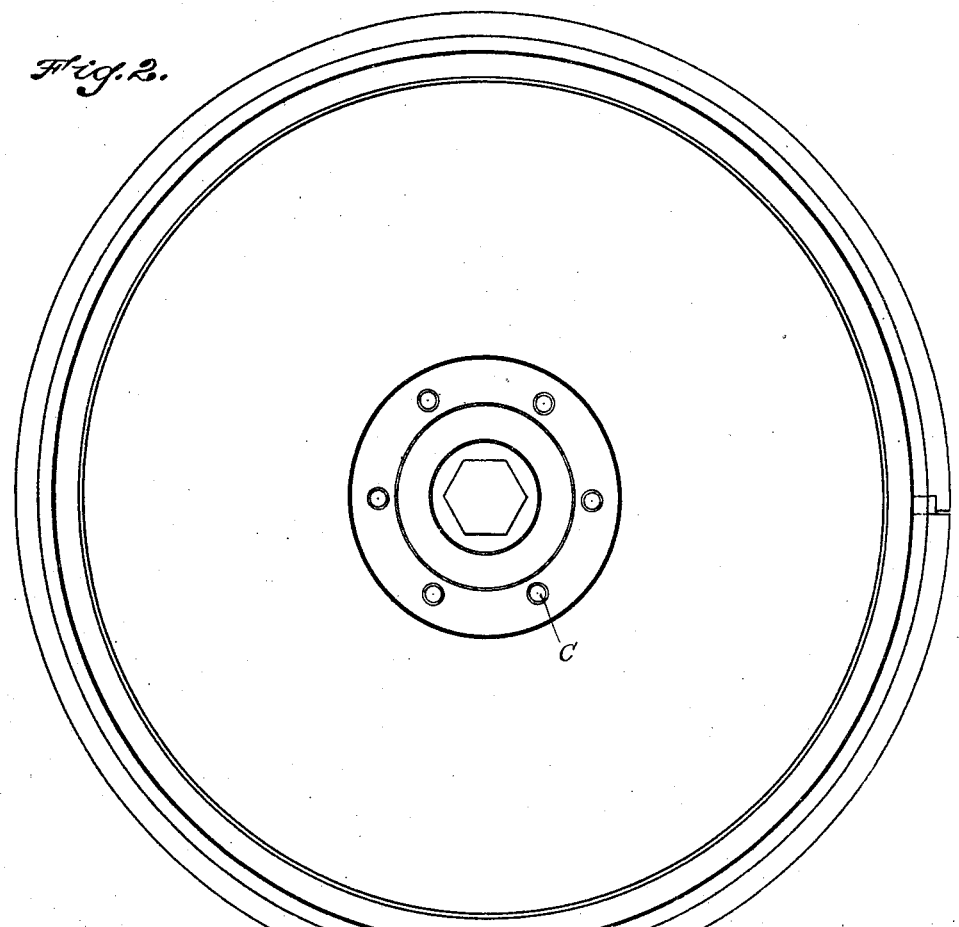
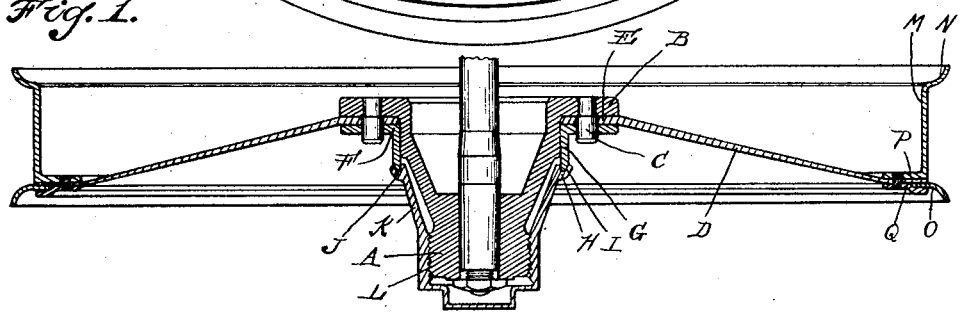
Inventor
Alden L. Putnam
By Whittem, Hulbert & Whittemore
Attorneys

UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

VEHICLE-WHEEL.

1,388,665.  Specification of Letters Patent.  Patented Aug. 23, 1921.

Application filed May 3, 1917. Serial No. 166,079.

*To all whom it may concern:*

Be it known that I, ALDEN L. PUTNAM, a citizen of the United States of America, residing at Detroit, in the county of Wayne and State of Michigan, have invented certain new and useful Improvements in Vehicle-Wheels, of which the following is a specification, reference being had therein to the accompanying drawings.

The invention relates to vehicle wheels of that type in which the body or center portion of the wheel is formed from a dished metallic disk peripherally attached to the rim or felly and detachably engaging the hub. The present invention relates to the means employed for attaching the wheel to the hub and also to various other features of construction as hereinafter set forth.

In the drawings:

Figure 1 is a cross-section through the wheel;

Fig. 2 is a side elevation thereof.

A is the hub of the wheel, which is formed with a flange B extending from the periphery thereof and having secured thereto a circular series of laterally-projecting pins C. D is a metallic disk, which is dished so that the central portion E lies in a plane on one side of the central plane of the wheel while the periphery of the disk is in a plane on the opposite side of said central plane. The disk is also of a tapering gage, the central portion being of greatest thickness and fitting around the hub A against the flange B. This portion is also apertured in registration with the pins C which forms the driving means for transmitting the torque. F is a reinforcing ring which may be either integral with or separate from the portion E of the disk, being correspondingly apertured to engage the pin C, and having an outwardly-extending portion G fitting about a portion H of the hub. The outer end of the portion G is preferably tapered, as indicated at I, to engage an annular groove J in a clamping cap member K, which latter has a threaded engagement L with the outer end of the hub. The arrangement is such that by screwing up the cap member on the hub the member G will be forced inward and will clamp the disk firmly to the flange B.

The rim M of the wheel may be formed in any suitable manner and provided with any suitable means for engagement with the tire. I have, however, devised a specific construction, which is as follows: The rim M has upon one side thereof the fixed flange N and upon the opposite side the detachable split flange O. To secure this detachable flange the rim is grooved, and this groove is preferably formed between an inwardly-turned flange P which is arranged upon one side of the disk D and a flange Q which is upon the oposite side of said disk. The two flanges may be secured to each other and to the disk by suitable fastening devices R, and the flange Q at its outer edge is offset to form the groove for receiving the flange O. Thus attachment of the rim to the disk and the means of attachment for the detachable flange of the rim is accomplished by the same structural elements.

What I claim as my invention is:

1. In a vehicle wheel, the combination with a centrally-apertured disk, of a hub for engaging the aperture in said disk and provided with an outwardly-extending flange on one side of the disk, driving pins projecting laterally from said flange and engaging registering apertures in the disk, a reinforcement for the central portion of the disk correspondingly apertured for engagement with said driving pins and provided with an outwardly-extending annular flange, and a hub-cap having a threaded engagement with said hub and a grooved bearing for engaging the outer end of said annular flange.

2. In a vehicle wheel, the combination with a centrally-apertured disk, of a hub for engaging the aperture of said disk and provided with a peripherally-extending flange arranged on one side of the disk, a reinforcement for the central portion of the disk arranged upon the opposite side thereof, an annular flange projecting outward from said reinforcement and sleeved upon said hub, and a cap having a threaded engagement with said hub, provided with a grooved inner end for engaging the outer end of said annular flange.

3. In a vehicle wheel, the combination with a centrally-apertured disk, of a hub for engaging the aperture in said disk, a flange projecting from the periphery of said hub arranged on one side of the disk, a reinforcement arranged on the opposite side of said disk and provided with an inner annular flange fitting the hub and projecting outward, a series of pins projecting laterally from the flange on said hub and engaging registering apertures in said disk and reinforcement, and a cap member having a threaded engagement with the hub, provided with a groove in its inner end for engaging the outer end of said annular flange.

4. In a vehicle wheel, the combination with a centrally-apertured disk, of a hub for engaging the aperture in said disk having an outwardly-extending flange at one side of the disk, driving pins projecting laterally from said flange and engaging registering apertures in the disk, a reinforcement for the central portion of the disk correspondingly apertured for engagement with said driving pins and provided with an annular flange, extending a short distance outwardly and a hub cap having a threaded engagement with the hub and adapted to bear against the outer edge of the outwardly-extending flange.

5. In a vehicle wheel, the combination with a centrally-apertured disk, of a hub for engaging the aperture in said disk provided with a radial annular extending flange at one side of the disk, a reinforcing member for the disk at the other side thereof also having an annular flange extending a short distance outwardly, driving pins projecting laterally from one of said flanges and engageable in registering apertures in the disk and other flange, and a member threaded upon the hub having engagement with the outer edge of said annular flange to clamp said reinforcing member against the disk and clamp the latter against said radial flange.

6. In a vehicle wheel, the combination with a hub having an outwardly-extending flange, a cylindrical portion adjacent thereto, a tapering portion, and a threaded portion at its outer end, of a disk apertured to engage said hub, a flange carried by said disk for engaging the cylindrical portion of said hub and projecting outward beyond the same, and a hub cap having a threaded engagement with said hub and an inwardly-extending flaring portion engaging the outer edge of said flange.

In testimony whereof I affix my signature.

ALDEN L. PUTNAM.